United States Patent
Kollias et al.

(10) Patent No.: US 12,450,168 B2
(45) Date of Patent: Oct. 21, 2025

(54) DYNAMIC UPDATING OF CONTENT ADDRESSABLE ASSOCIATIVE MEMORIES FOR LARGE LANGUAGE MODELS

(71) Applicant: International Business Machines Corporation, Armonk, NY (US)

(72) Inventors: Georgios Kollias, White Plains, NY (US); Elliot Nelson, Malvern, PA (US); Payel Das, Yorktown Heights, NY (US); Subhajit Chaudhury, White Plains, NY (US); Aurelie Chloe Lozano, Scarsdale, NY (US); Pin-Yu Chen, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 71 days.

(21) Appl. No.: 18/428,422

(22) Filed: Jan. 31, 2024

(65) Prior Publication Data

US 2025/0245170 A1    Jul. 31, 2025

(51) Int. Cl.
 *G06F 12/12*    (2016.01)
 *G06F 12/14*    (2006.01)

(52) U.S. Cl.
 CPC .......... *G06F 12/12* (2013.01); *G06F 12/1466* (2013.01)

(58) Field of Classification Search
 CPC .............................. G06F 12/12; G06F 12/1466
 See application file for complete search history.

(56) References Cited

U.S. PATENT DOCUMENTS

| 8,589,163 | B2 | 11/2013 | Ljolje et al. |
| 11,182,028 | B2 * | 11/2021 | Lee .......... G06F 3/046 |
| 12,223,269 | B2 * | 2/2025 | He .......... G06F 40/284 |
| 2023/0316006 | A1 | 10/2023 | Tunstall-Pedoe et al. |
| 2023/0343324 | A1 | 10/2023 | Baeuml et al. |

FOREIGN PATENT DOCUMENTS

| CN | 116127020 A | 5/2023 |
| CN | 116935288 A | 10/2023 |
| CN | 116975192 A | 10/2023 |

(Continued)

OTHER PUBLICATIONS

Longuet-Higgins et al., "Theories of associative recall." Quarterly reviews of biophysics 3.2 (1970): 223-244.

(Continued)

*Primary Examiner* — Aracelis Ruiz
(74) *Attorney, Agent, or Firm* — CANTOR COLBURN LLP; Jordan Schiller (57) ABSTRACT

A computerized system includes a generative large language model (LLM). The LLM includes an encoder configured to provide a vector input to a content addressable memory system and a decoder configured to receive a vector output from the content addressable memory system and generate a data output. The content addressable memory system is configured to receive the vector input and generate a vector output based on data contents of the content addressable memory system. The content addressable memory system is configured to respond to receiving at least one memory update command by updating the data contents of the content addressable memory system.

20 Claims, 6 Drawing Sheets

(56) References Cited

FOREIGN PATENT DOCUMENTS

CN 117093679 A 11/2023

OTHER PUBLICATIONS

Meng et al. "Mass-editing memory in a transformer." arXiv preprint arXiv:2210.07229 (2023): 21 pages.
Meng et al., Locating and editing factual associations in GPT, Advances in Neural Information Processing Systems. (2022): 35 pages.
Meng, Yuanliang et al., "Context-aware neural model for temporal information extraction." Proceedings of the 56th annual meeting of the association for computational linguistics (2018): 10 pages.
Mitchell et al., "Fast Model Editing at Scale." International Conference on Learning Representations. (2021): 21 pages.
Mitchell et al., "Memory-based model editing at scale." International Conference on Machine Learning. PMLR, (2022): 15 pages.
Murdock, Bennet B. "Developing TODAM: Three models for serial-order information." Memory & Cognition 23.5 (1995): 631-645.
Personnaz et al., "Collective computational properties of neural networks: New learning mechanisms." Physical Review A 34.5 (1986): 4217-4228.
Petroni et al., "Language models as knowledge bases?. " arXiv preprint arXiv:1909.01066 (2019): 11 pages.
Pham et. al. "Generative Pseudo-Inverse Memory" ICLR (2022): 18 pages.
Plate, Tony A. "Holographic reduced representations." IEEE Transactions on Neural networks 6.3 (1995): 21 pages.
Rae, Jack, et al. "Scaling memory-augmented neural networks with sparse reads and writes." Advances in Neural Information Processing Systems 29 (2016): 9 pages.
Ramsauer et al., "Hopfield networks is all you need." arXiv preprint arXiv:2008.02217 (2020): 94 pages.
Raunak et al., "Rank-One Editing of Encoder-Decoder Models." arXiv preprint arXiv:2211.13317 (2022): 6 pages.
Redhakrishnan et al., "Overparameterized neural networks implement associative memory." Proceedings of the National Academy of Sciences 117.44 (2020): 27162-27170.
Saha et al., "Gradient projection memory for continual learning." arXiv preprint arXiv:2103.09762 (2021): 18 pages.
Salvatori et al., "Associative memories via predictive coding." Advances in Neural Information Processing Systems 34 (2021): 13 pages.
Schlag et al., "Linear transformers are secretly fast weight programmers." International Conference on Machine Learning. PMLR, (2021) 12 pages.
Shun-Ichi Amari. "Learning patterns and pattern sequences by self-organizing nets of threshold elements." IEEE Transactions on computers 100.11 (1972): 1197-1206.
Smolensky, Paul. "Tensor product variable binding and the representation of symbolic structures in connectionist systems." Artificial intelligence 46.1-2 (1990): 159-216.
Stiles et al., "On the effect of noise on the Moore-Penrose generalized inverse associative memory." IEEE transactions on pattern analysis and machine intelligence 3 (1985): 358-360.
Sukhbaatar et al. "End-to-end memory networks." Advances in neural information processing systems 28 (2015): 9 pages.
Sukhbaatar et al., "Augmenting self-attention with persistent memory." arXiv preprint arXiv:1907.01470 (2019): 11 pages.
Sukhbaatar et al., "Not all memories are created equal: Learning to forget by expiring." International Conference on Machine Learning. PMLR, (2021): 11 pages.
Valle-Lisboa et al., "Multiplicative processing in the modeling of cognitive activities in large neural networks." Biophysical Reviews (2023): 1-19.
Willshaw et al. "Non-holographic associative memory." Nature 222.5197 (1969): 960-962.
Whittington et al., "Relating transformers to models and neural representations of the hippocampal formation." arXiv preprint arXiv:2112.04035 (2021): 20 pages.
Wu et al. "The Kanerva machine: A generative distributed memory." arXiv preprint arXiv:1804.01756 (2018): 16 pages.
Wu et al., "Learning attractor dynamics for generative memory." Advances in Neural Information Processing Systems 31 (2018): 10 pages.
Wu, Yuhuai et al. "Memorizing Transformers." International Conference on Learning Representations. (2021): 19 pages.
Yen et al., "A learning and forgetting algorithm in associative memories. The eigenstructure method." [1991] Proceedings of the 30th IEEE Conference on Decision and Control. IEEE, (1991): pp. 847-852.
Zhang et al., "Hippocampal spatial representations exhibit a hyperbolic geometry that expands with experience." Nature Neuroscience 26.1 (2023): 131-139.
Yen et al., "A learning and forgetting algorithm in associative memories: results involving pseudo inverses." 1991., IEEE International Symposium on Circuits and Systems. IEEE, (1991): pp. 778-781.
Steinbuch, K "Die Lernmatrice" Kybernetik, 1(1): Jan. 1961. pp. 36-45.
Anderson, J. A., "A simple neural network generating an interactive memory," Mathematical Biosciences, vol. 14, (1972): pp. 197-220.
Bau et al. "Rewriting a Deep Generative Model." arXiv preprint arXiv:2007.15646 (2020): 31 pages.
Weston et al., "Memory Networks." in 3rd ICLR (2015): 15 pages.
Armand Joulin et al., "Inferring algorithmic patterns with stack-augmented recurrent nets." Advances in neural information processing systems 28 (2015): 9 pages.
Bietti et al., "Birth of a Transformer: A Memory Viewpoint." arXiv preprint arXiv:2306.00802 (2023): 28 pages.
Bricken et al., "Attention approximates sparse distributed memory." Advances in Neural Information Processing Systems 35 (2021): 15 pages.
Bricken et al., "Sparse Distributed Memory is a Continual Learner." arXiv preprint arXiv:2303.11934 (2023): 57 pages.
Burtsev et al., "Memory transformer." arXiv preprint arXiv:2006.11527 (2020): 17 pages.
Cabannes et al, "Scaling laws for associative memories." arXiv preprint arXiv:2310.02984 (2023): 32 pages.
Caplan et al., "Associative recognition without hippocampal associations." Psychological Review 129.6 (2022): 54 pages.
Cheng et al., "Language model with Plug-in Knowldge Memory." ICLR (2022): 22 pages.
Dai et al., "Knowledge neurons in pretrained transformers." arXiv preprint arXiv:2104.08696 (2021): 10 pages.
Dai et al., "Neural knowledge bank for pretrained transformers." CCF International Conference on Natural Language Processing and Chinese Computing. Cham: Springer Nature Switzerland, (2023): 11 pages.
De Cao, Nicola et al., "Editing Factual Knowledge in Language Models." Proceedings of the 2021 Conference on Empirical Methods in Natural Language Processing. (2021): pp. 6491-6506.
Dong et al., "Calibrating factual knowledge in pretrained language models." arXiv preprint arXiv:2210.03329 (2022): 11 pages.
Eldan et al., "Who's Harry Potter? Approximate unlearning in LLMs," arXiv:2310.02238v2, (2023): 21 pages.
Elhage et al., "A mathematical framework for transformer circuits." Transformer Circuits Thread 1 https://transformer-circuits.pub/2021/framework/index.html (retrieved Jan. 29, 2024), 47 pages.
Fan et al., "Augmenting transformers with KNN-based composite memory for dialog." Transactions of the Association for Computational Linguistics 9 (2021): 82-99.
Farajtabar et al., "Orthogonal gradient descent for continual learning." International Conference on Artificial Intelligence and Statistics. PMLR, (2020): 11 pages.
Feldman et al., "What neural networks memorize and why: Discovering the long tail via influence estimation." Advances in Neural Information Processing Systems 34 (2020): 11 pages.

(56) References Cited

OTHER PUBLICATIONS

Feldman, Vitaly. "Does learning require memorization? a short tale about a long tail." Proceedings of the 52nd Annual ACM SIGACT Symposium on Theory of Computing. (2020): pp. 954-959.
Geva et al., "Transformer Feed-Forward Layers are Key-Value Memories." Proceedings of the 2021 Conference on Empirical Methods in Natural Language Processing. (2021): pp. 5484-5495.
Geva et al., "Transformer feed-forward layers build predictions by promoting concepts in the vocabulary space." arXiv preprint arXiv:2203.14680 (2022): 16 pages.
Gorban et al., "Blessing of dimensionality: mathematical foundations of the statistical physics of data." Philosophical Transactions of the Royal Society A: Mathematical, Physical and Engineering Sciences 376.2118 (2018): 18 pages.
Grave, Edouard et al "Improving neural language models with a continuous cache." arXiv preprint arXiv:1612.04426 (2016): 9 pages.
Graves et al., "Unbounded cache model for online language modeling with open vocabulary." Advances in neural information processing systems 30 (2017): 11 pages.
Graves, Alex et al., "Neural turing machines." arXiv preprint arXiv:1410.5401 (2014): 26 pages.
Graves, Alex, et al. "Hybrid computing using a neural network with dynamic external memory." Nature 538.7626 (2016): 21 pages.
Gulcehre et al. "Dynamic neural turing machine with continuous and discrete addressing schemes." Neural computation 30.4 (2018): 24 pages.
Hopefield, John J. "Neural networks and physical systems with emergent collective computational abilities." Proceedings of the national academy of sciences 79.8 (1982): 2554-2558.
Howard, Marc W. "Formal models of memory based on temporally-varying representations." The new handbook of mathematical psychology 3 (2022): 40 pages.
Huang et al, "Transformers-patcher: One mistake with one neuron," ICLR (2023): 16 pages.
Iscen et al., "Improving image recognition by retrieving from web-scale image-text data." Proceedings of the IEEE/CVF Conference on Computer Vision and Pattern Recognition. (2023): pp. 19295-19304.
Kanerva, Pentti, "Sparse distributed memory," MIT Press chapter 3, (1988): 53 pages.
Kanerva, Pentti. "Sparse distributed memory and related models," No. NASA-CR-190553. (1992): 58 pages.
Kohonen et al., "Representation of associated data by matrix operators." IEEE Transactions on Computers 100.7 (1973): 701-702.
Kohonen, Teuvo. "Correlation matrix memories." IEEE transactions on computers 100.4 (1972): 353-359.
Kohonen, Teuvo , "Self-organization and associative memory," vol. 8, chapter 1, Springer Science & Business Media, (2012) pp. 1-11, 14-18, 21-25. & 28.
Krotov, Dmitry et al., "Large associative memory problem in neurobiology and machine learning." arXiv preprint arXiv:2008.06996 (2020): 12 pages.
Krotov, Dmitry. "Hierarchical Associative Memory." arXiv preprint arXiv:2107.06446 (2021): 13 pages.
Kuh, Anthony. "Performance measures for associative memories that learn and forget." Neural Information Processing Systems. (1987): pp. 432-441.
Lample et al. "Large memory layers with product keys." Advances in Neural Information Processing Systems 32 (2019): 12 pages.
Le et al. "Variational memory encoder-decoder." Advances in neural information processing systems 31 (2018): 11 pages.
Le et al., "Learning to remember more with less memorization." arXiv preprint arXiv:1901.01347 (2019): 20 pages.
Le, Hung et al., "Self-attentive associative memory." International Conference on Machine Learning. PMLR, (2020): 10 pages.
Liang et al., "Associative Learning for Network Embedding." arXiv preprint arXiv:2208.14376 (2022): 5 pages.
Little, William A. "The existence of persistent states in the brain." Mathematical biosciences 19.1-2 (1974): 101-120.
Liu et al., "Think-in-Memory: Recalling and Post-thinking Enable LLMs with Long-Term Memory." arXiv preprint arXiv:2311.08719 (2023): 9 pages.
Mablestone, Adam et al., "Product kanerva machines: Factorized bayesian memory." arXiv preprint arXiv:2002.02385 (2020): 20 pages.
Maekawa et al., "Generative Replay Inspired by Hippocampal Memory Indexing for Continual Language Learning." Proceedings of the 17th Conference of the European Chapter of the Association for Computational Linguistics. (2023): pp. 930-942.
McClelland et al., "Why there are complementary learning systems in the hippocampus and neocortex: insights from the successes and failures of connectionist models of learning and memory." Psychological review 102.3 (1995): 419-457.
Li et al., "Optimus: Organizing Sentences via Pre-trained Modeling of a Latent Space" arXiv, Apr. 5, 2020, 22 pages, doi: https://arxiv.org/abs/2004.04092v4.

* cited by examiner

| Sizes of (i) all episodes (ii) most recent episode | Forgotten (f) | Initial (i) | Recent (r) |
|---|---|---|---|
| Forget newer data | (N--, N) = (600, 10) | 0.593 (0.875) | 0.856 (0.850) | 0.825 (0.865) |
| Forget older data | (N--, N) = (600, 490) | 0.621 (0.848) | 0.856 (0.835) | 0.852 (0.849) |
| Forget newer data | (N--, N) = (900, 10) | 0.822 (0.873) | 0.847 (0.842) | 0.800 (0.817) |
| Forget older data | (N--, N) = (900, 690) | 0.727 (0.821) | 0.866 (0.847) | 0.850 (0.848) |

FIG. 6

DYNAMIC UPDATING OF CONTENT ADDRESSABLE ASSOCIATIVE MEMORIES FOR LARGE LANGUAGE MODELS

BACKGROUND

The present invention generally relates to utilization of large language models (LLMs), and more specifically, to dynamically updating addressable associative memories for LLMs. LLMs are a form of generative artificial intelligence used to construct phrases and sentences based on received inputs.

SUMMARY

Embodiments of the present invention are directed to a system for dynamically updating an addressable associative memory. A non-limiting example of the system includes a computerized system having a generative large language model (LLM). The LLM includes an encoder configured to provide a vector input to a content addressable memory system and a decoder configured to receive a vector output from the content addressable memory system and generate a data output. The content addressable memory system is configured to receive the vector input and generate a vector output based on data contents of the content addressable memory system. The content addressable memory system is configured to respond to receiving at least one memory update command by updating the data contents of the content addressable memory system. Embodiments of the invention are directed to a computer implemented method for utilizing the update commands to modify the content addressable memory.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the operations can be performed in a differing order or operations can include add, delete or modify. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

A computerized system includes a generative large language model (LLM). The LLM includes an encoder configured to provide a vector input to a content addressable memory system and a decoder configured to receive a vector output from the content addressable memory system and generate a data output. The content addressable memory system is configured to receive the vector input and generate a vector output based on data contents of the content addressable memory system. The content addressable memory system is configured to respond to receiving at least one memory update command by updating the data contents of the content addressable memory system. This enables an operator to update an output of an LLM system using memory update commands.

In another example, the content addressable memory system is further configured to dynamically modify an associative memory matrix on which the LLM operates without modifying the LLM. This allows the update commands to be limited to individual content addressable memory systems, thereby allowing updates to be tailored to individual uses and allowing distinct users to utilize the same underlying LLM with their own tailored outputs.

In another example, the content addressable memory system includes a static addressing mode, thereby allowing consistent command contexts across multiple uses while in the static addressing mode.

In another example, the data contents of the content addressable memory system includes distinct data elements, and wherein an address of each data element in the data contents is statically dependent on the data element such that the address of each data element is dependent on the data element in a fixed, constant way, across a sequence of operations to the memory system thereby enabling consistent usage of static addressing based commands.

In another example, the static memory addressing mode defines an injective mapping of data elements, thereby enabling the effective implementation of selective forget operation.

In another example the content addressable memory system includes a dynamic addressing mode, thereby allowing a shifting of addresses for the same data item as memory evolves.

In another example, the data contents of the content addressable memory system includes distinct data elements, and wherein addresses of data elements in the data contents are dynamically dependent on the data element and a current status of the content addressable memory system thereby enabling the investigation of how a data item maps to memory slots for different contexts represented as different memory states.

In another example, the content addressable memory system includes a key generation subsystem and a memory update system configured to cooperatively update the data contents of the content addressable memory system based on the at least one memory update command, thereby enabling further granularity and flexibility in the commands and sequences of commands able to be implemented.

In one example, a method for updating a content addressable memory system includes receiving a memory update command at a memory system of a generative large language model (LLM), wherein the generative LLM includes an encoder configured to provide a vector input to the content addressable memory system and a decoder configured to receive a vector output from the content addressable memory system and generate a data output. The content addressable memory system responds to the memory update command by editing at least one data element of the content addressable memory system in accordance with the update command. This enables an operator to update an output of an LLM system using memory update commands.

In another example, the method includes identifying the at least one data element to be edited using an addressing system configured to identify the at least one data element based on one of a static memory address and a dynamic memory address thereby enabling specifically and targeted updates to the content addressable memory system.

In another example, updating the at least one data element comprises dynamically modifying an associative memory on which the LLM operates without modifying the LLM. This allows the update commands to be limited to individual content addressable memory systems, thereby allowing updates to be tailored to individual uses and allowing distinct users to utilize the same underlying LLM with their own tailored outputs.

In another example, the content addressable memory system includes static memory addresses, and wherein the data contents of the content addressable memory system includes distinct data elements, and the address of any given data element is statically dependent on the data element, such that the address of each data element is dependent on the data element in a fixed, constant way, across a sequence of operations to the memory system.

In another example, the static memory addresses defines an injective mapping thereby enabling the effective implementation of selective forget operation.

In another example of the method, the content addressable memory system includes dynamic memory addresses, and wherein data contents of the content addressable memory system includes distinct data elements, and wherein an address of each data element in the data contents is dynamically dependent on the data element and a current status of the content addressable memory system thereby enabling the investigation of how a data item maps to memory slots for different contexts represented as different memory states.

In another example of the method, the update command includes at least one of an add operation, a blurry add operation, a forget operation, and a weak forget operation, thereby defining a method operable using multiple distinct operations.

In another example of the method, the add operation alters a data element by adding to the data element and the forget operation alters the data element by removing the data element, thereby allowing memory elements to be updating in specific manners, depending on an operator's command.

In another example of the method, the update command includes a sparsification component thereby allowing for the memory addresses to be updated to be more or less sparse.

In another example of the method, the method responds to the sparsification component by sparsifying the memory address of the identified data element thereby enabling more memory-efficient representations of addresses (e.g. resulting in faster memory operations) and memory-access control (e.g. restrict access to memory slots that encode inputs that are required to be masked).

In another example, a computer program product storing a content addressable memory system configured to interface with a generative LLM, wherein the content addressable memory system is configured to receive a vector input from an encoder of the generative LLM and is configured to provide a vector output to a decoder of the generative LLM. This enables distribution of software for enacting any of the previously described methods.

In another example of the computer program product, the content addressable memory system includes a key generation subsystem and a memory update system configured to cooperatively update the data contents of the content addressable memory system based on the at least one memory update command. This allows for the distribution of individual memory systems further enabling individual tailoring of the output without requiring alteration of the underlying LLM.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

A generative large language model (LLM) (e.g., a generative artificial intelligence (AI) chatbot or a computer vision tool) can generate hallucinations by perceiving patterns or objects that are nonexistent or imperceptible to human observers, which lead to outputs that are factually incorrect or nonsensical or include invented details. LLM-generated hallucinations may facilitate the spread of misinformation and can reinforce biases and stereotypes present in training data, thereby worsening social problems such as discrimination. These hallucinations can also weaken trust in AI content and obstruct the adoption of AI in certain domains.

Embodiments of the present invention address the aforementioned unique challenges by providing a generative LLM (i.e., an LLM encoder-decoder) that is augmented with one or more addressable external memory units (alternatively referred to as external memory units, addressable memory units, and memory units). The addressable external memory units include a generative associative memory network set (also referred to herein as an episodic associative memory network). Hereinafter, the generative LLM augmented with the aforementioned addressable external memory unit is also collectively referred to as the enhanced generative LLM.

The enhanced generative LLM mimics the bi-directional neocortex-hippocampus interactions and divisions of labor in the human brain, thereby providing the generative LLM with an ability to explicitly encode information and form memories, which facilitates the performing of tasks that require long-term dependencies, such as hallucination prevention, reasoning, generalization, and value alignment. The neocortex, which interacts with the world and maintains a semantic representation of the world, is approximated by the generative LLM. The hippocampus, which retains recent (i.e., episodic) memories, gradually consolidates the recent memories into longer-term memories, and is involved in the retrieval of memories is approximated by the generative associative memory network set.

In one embodiment, the generative LLM is significantly larger in size and complexity than the external memory unit. The external memory unit is associative, generative, and sparsely distributed. Further, the external memory unit is addressable including specific memory addresses for each element of data stored within. In some examples, the memory unit utilizes dynamic addressing and in other examples the external memory unit utilizes static addressing.

Static memory addressing defines an injective mapping of data items stored or to be stored in memory to weighted memory slot addresses. In this configuration, identical memory slots and weights are used in adding and deleting a specific data item. In static addressing mode, the memory system can host various schemes for realizing static memory reference frames.

Dynamic memory addressing allows a shifting of addresses for the same data item as memory evolves. This further includes an ability to investigate how a data item maps to memory slots for different contexts represented as different memory states.

Because of the sparsely distributed aspect and latent encoding of memory, the memory size in the enhanced generative LLM architecture is independent of the input data dimensions. Furthermore, the sparsely distributed aspect allows an increase in the capacity of associative memory by reducing overlap between memory representations.

In one embodiment, the framework provided by the enhanced generative LLM memory provides (i) associativity (i.e., memory retrieval with denoising), (ii) generative memory (i.e., sampling from learned memory distribution), (iii) fast and dynamic update (i.e., memory that is explicitly modified at runtime), (iv) memory-based inference (i.e., at generation time (also known as decoding time), the distribution is conditioned on memory), and (v) scalability (i.e., efficient memory storage whereby the number of storage items can grow per fixed memory size without significant information loss). The aforementioned associativity includes an ability to retrieve a remembered pattern based on a distorted or incomplete version of the pattern. The aforementioned fast and dynamic update includes a fast belief update in response to an arrival of a new data episode, thereby enabling fast episodic learning.

In one embodiment the addressable external memory unit allows for the removal of specific targeted data from the external memory unit. This feature can be utilized to remove sensitive, unverified and/or incorrect knowledge from the memory. In another example, this feature can be utilized to remove data elements that are no longer relevant from the external memory unit.

In another embodiment, the addressable external memory unit can be used to alter targeted memories in order to strengthen the targeted memories, restrict application of the targeted memories and/or control a granularity of the targeted memories.

In yet further embodiments, the utilization of an addressable external memory unit can increase memory operation speeds and/or increase space efficiency of the external memory unit.

Figure 1:
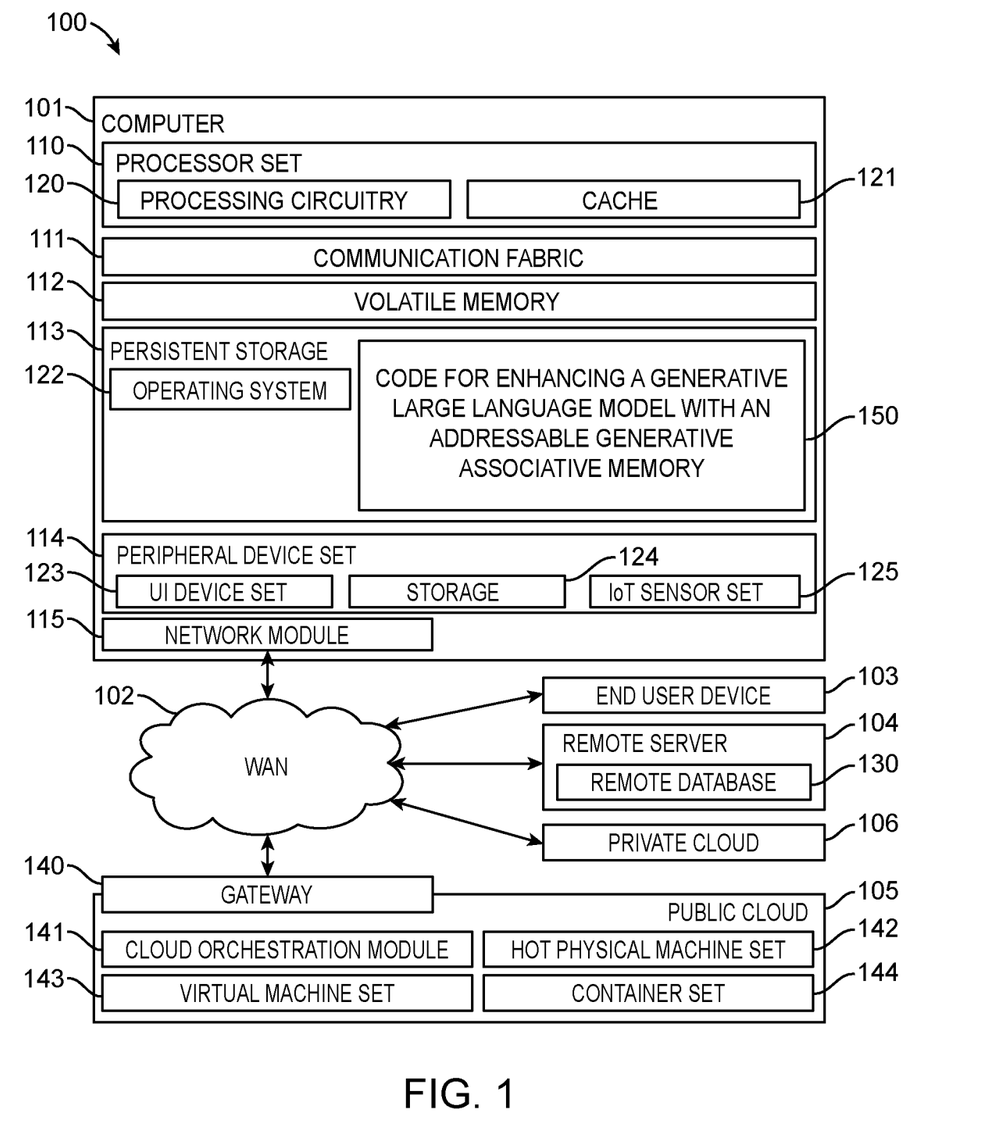
FIG. 1 depicts one exemplary cloud computing system configured to implement the system and method according to one embodiment.

Computing environment 100 contains an example of an environment for the execution of at least some of the computer code involved in performing the inventive methods, such as code for enhancing a generative large language model with an addressable generative associative memory at block 150. In addition to block 150, computing environment 100 includes, for example, computer 101, wide area network (WAN) 102, end user device (EUD) 103, remote server 104, public Cloud 105, and private Cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 132. Public Cloud 105 includes gateway 130, Cloud orchestration module 131, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 132. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a Cloud, even though it is not shown in a Cloud in FIG. 1. On the other hand, computer 101 is not required to be in a Cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future.

In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collects and store helpful and useful data for use by other computers, such as computer 101. For example, in a hypothetical case where computer 101 is designed and programmed to provide a recommendation based on historical data, then this historical data may be provided to computer 101 from remote database 132 of remote server 104.

PUBLIC CLOUD 105 is any computer system available for use by multiple entities that provides on-demand availability of computer system resources and/or other computer capabilities, especially data storage (Cloud storage) and computing power, without direct active management by the user. Cloud computing typically leverages sharing of resources to achieve coherence and economies of scale. The direct and active management of the computing resources of public Cloud 105 is performed by the computer hardware and/or software of Cloud orchestration module 131. The computing resources provided by public Cloud 105 are typically implemented by virtual computing environments that run on various computers making up the computers of host physical machine set 142, which is the universe of physical computers in and/or available to public Cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 131 manages the transfer and storage of images, deploys new instantiations of VCEs and manages active instantiations of VCE deployments. Gateway 130 is the collection of computer software, hardware, and firmware that allows public Cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public Cloud 105, except that the computing resources are only available for use by a single enterprise. While private Cloud 106 is depicted as being in communication with WAN 102, in other embodiments a private Cloud may be disconnected from the internet entirely and only accessible through a local/private network. A hybrid Cloud is a composition of multiple Clouds of different types (for example, private, community or public Cloud types), often respectively implemented by different vendors. Each of the multiple Clouds remains a separate and discrete entity, but the larger hybrid Cloud architecture is bound together by standardized or proprietary technology that enables orchestration, management, and/or data/application portability between the multiple constituent Clouds. In this embodiment, public Cloud 105 and private Cloud 106 are both part of a larger hybrid Cloud.

Figure 2:
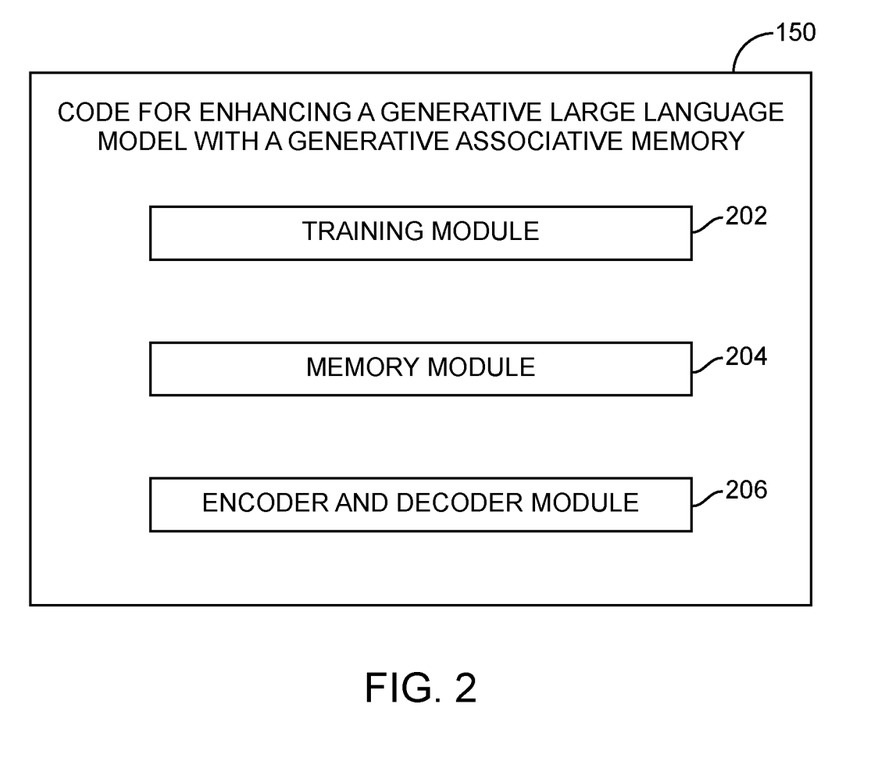
FIG. 2 depicts a generative large language model (LLM) enhanced with a generative associative memory.

FIG. 2 is a block diagram of modules included in block 150 included in the computing environment 100 of FIG. 1, in accordance with embodiments of the present invention. Block 150 includes a training module 202, a memory module 204, and an encoder and decoder module 206.

Training module 202 is configured to jointly train, end-to-end, (i) an encoder and a decoder included in a generative LLM and (ii) an external memory unit, which results in a joint optimization of the decoder and the external memory unit. As a result of the joint training, the generative LLM and external memory unit learn to store sentence encodings in a memory matrix, which is used during decoding performed by the decoder. The joint training ensures that the generative associative memory network set included in the external memory unit is sparsely distributed. That is, the capacity of the generative associative memory network set can be increased by reducing overlap between memory representations.

Memory module 204 is configured to augment the generative LLM with a global memory in the addressable external memory unit, so that in response to an update to the global memory, the generative LLM can perform operations efficiently in accordance with the updated global memory, which can assist in updating knowledge and preventing hallucinations. The addressable external memory unit is associative, generative, and sparsely distributed, stores episodic memories (i.e., information about a recent episode or a past episode), and consolidates stored episodic memories into a long-term memory. The memory module 204 is addressable and configured to receive and implement memory updates to specific elements of data stored within the addressable external memory unit, and can be configured with either dynamic addressing or static addressing. In some examples, the addressable memory allows for additions to, or subtractions from, the memory to alter or remove possible outputs without altering the underlying LLM. By way of example, when the combined LLM and memory learns to output an undesirable phrase, the memory can be altered to update with a more desirable phrase, or to forget the undesirable phrase entirely.

Memory module 204 is further configured to perform a fast update of the generative associative memory network set during an inference, thereby mimicking the hippocampus of the human brain and providing the generative LLM with a novel adaptivity to updated information, without requiring the traditional re-training or fine-tuning of the generative LLM.

Memory module 204 is further configured to provide fast and accurate memory operations, including a write into, a read from, a denoise from, and a generate from the generative associative memory. In one embodiment, memory module 204 provides other memory operations, such as free-form and prompt-based generation from a memory episode, memory retrieval with a partial or noisy prompt, memory update as a new data episode arrives, iterative denoising, and iterative memory update.

Memory module 204 is further configured to provide an improved language modeling which is indicated by an improvement in sentence reconstruction error and an improvement in language perplexity. Memory module 204 is further configured to provide one-shot learning and generation during an inference, even if the data is out of distribution (OOD) to what the model has been shown previously.

Memory module 204 is further configured to modify an input to the decoder based on the knowledge in the memory module 204 during an inference. The memory module provides fast and near perfect memory recall, and memory consolidation (i.e., consolidating recent (i.e., episodic) memories into long-term memories). Memory module 204 is further configured to uniquely address memories thereby allowing for memory removal (forgetting) and memory updating (changing).

Encoder and decoder module 206 is configured to use a neural network as an encoder to generate a low-dimensional representation of a language input as a latent vector. Encoder and decoder module 206 is further configured to use a decoder to decode a memory encoding of the language input. Encoder and decoder module 206 is further configured to generate a response to a prompt during an inference. In one embodiment, the response generated by the encoder and decoder module 206 is based on the aforementioned knowledge update of the decoder.

The functionality of the modules included in code 200 is described in more detail in the discussions presented below relative to FIG. 3 through FIG. 6, inclusive.

Figure 3:
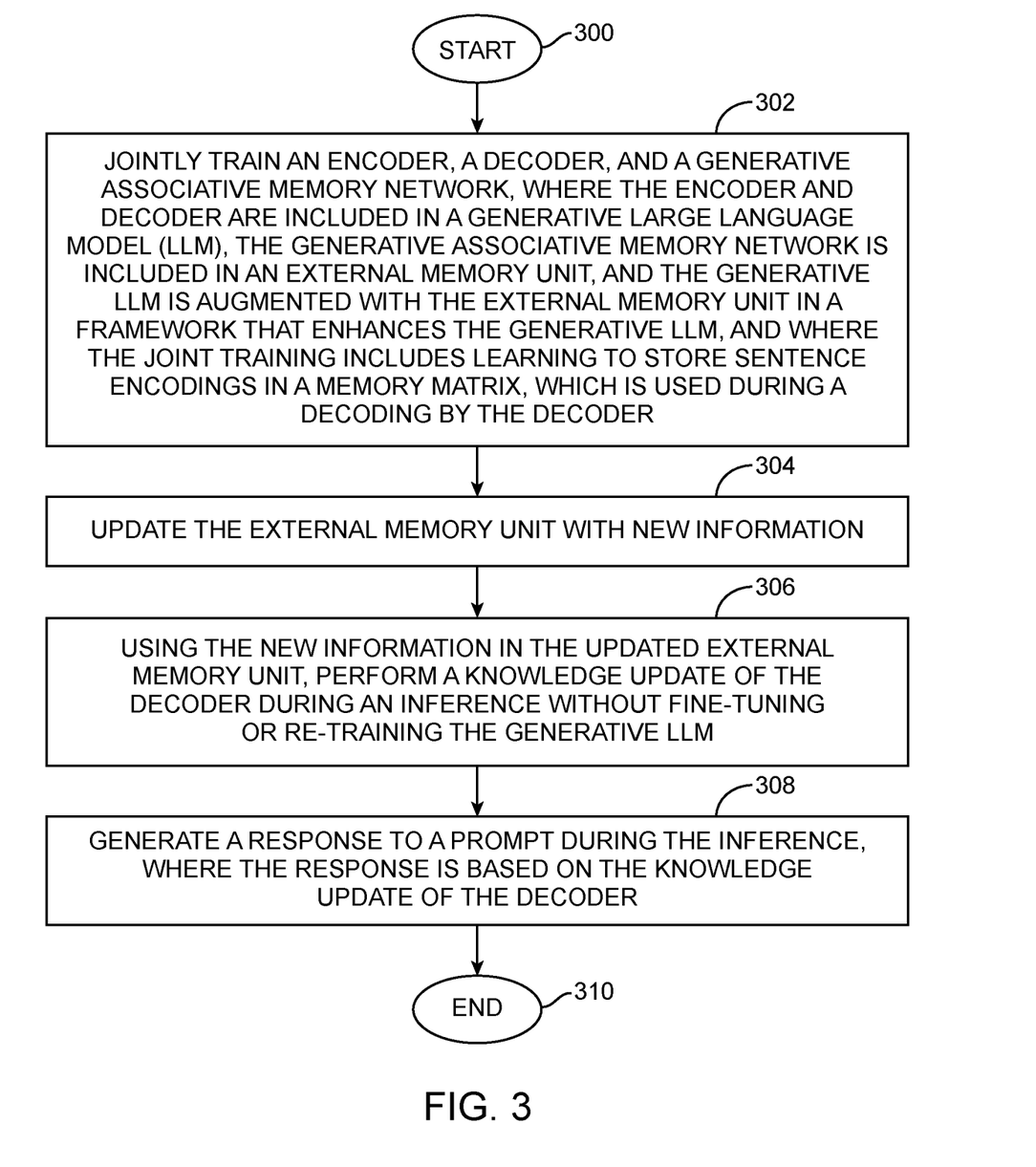
FIG. 3 depicts a process for enhancing a generative LLM with a content addressable associative memory.

FIG. 3 is a flowchart of a process of enhancing a generative LLM with an addressable external memory unit, where operations of the flowchart are performed by the modules in FIG. 2, in accordance with embodiments of the present invention. The process of FIG. 3 begins at a start node 300. In step 302, training module 202 jointly trains an encoder, a decoder, and a generative associative memory network set. The encoder and decoder are included in a generative LLM. The generative associative memory network set is included in an external memory unit. The generative LLM is augmented with the external memory unit in a framework that enhances the generative LLM. The joint training performed in step 302 includes learning the store sentence encodings or language encodings in a memory matrix, which is used during a decoding performed by the decoder.

In step 304, memory module 204 updates the external memory unit with new information. In some examples, this can include altering data, forgetting data, altering data for a duration of time and/or forgetting data for a duration or after a duration ends.

In step 306, the input to the decoder module 206 is modified based on using the new information in the updated external memory unit without fine-tuning or re-training the generative LLM.

In step 308, encoder and decoder module 206 generates a response to a prompt during the inference. The response is based on the knowledge update of the decoder, which was performed in step 306.

Following step 308, the process of FIG. 3 ends at an end node 310.

Figure 4:
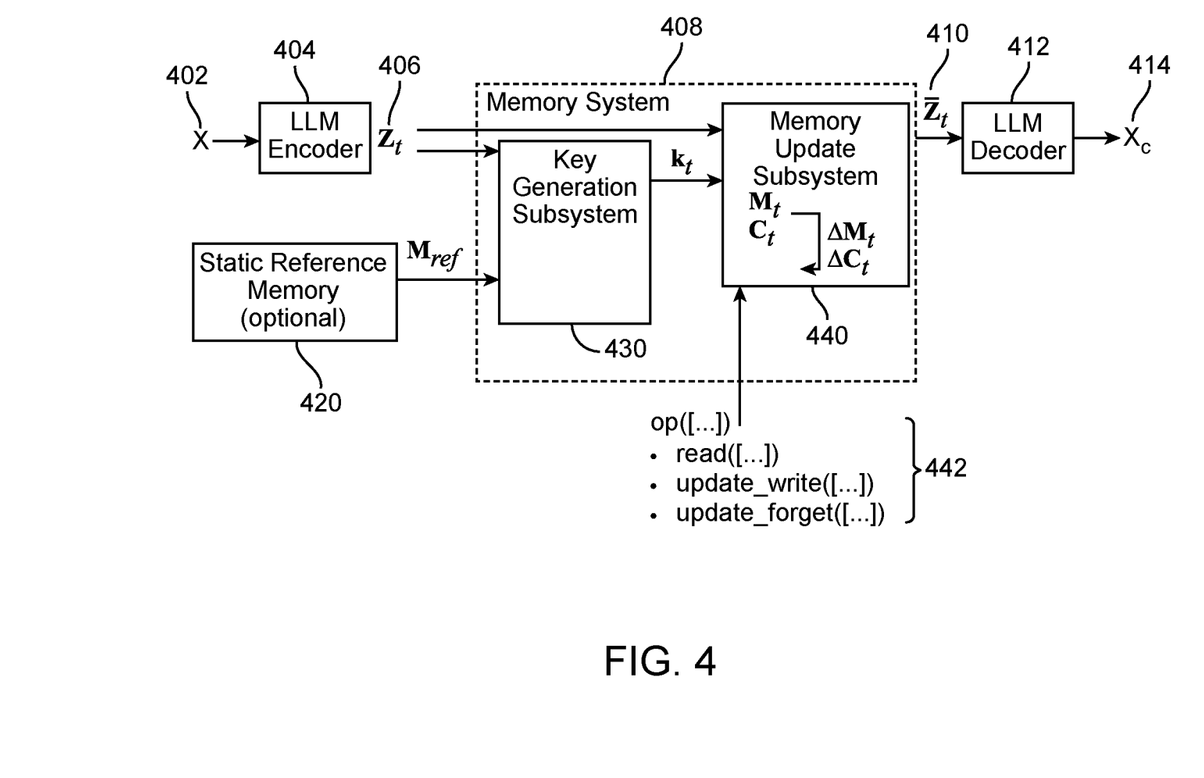
FIG. 4 depicts an architecture for achieving the process of FIG. 3.

FIG. 4 is a block diagram of an overview 400 of an architecture for enhancing a generative LLM with an external memory unit. Overview 400 includes a data input 402 (i.e., X), which is input into an encoder 404. Encoder 404 is a neural network included in the generative LLM. Encoder 404 outputs a latent vector 406 (i.e., z), which is the low-dimensional representation of X. The latent vector z is input into a memory 408, which is the generative associative memory included in the external memory unit that augments the generative LLM. Memory 408 is a fixed-size memory. Memory 408 outputs a latent vector 410 (i.e., zo), which is the memory encoding of X. The latent vector zo is input into a decoder 412, which is another neural network included in the generative LLM. Decoder 412 outputs a data output 414 (i.e., Xo). Again, training module 202 jointly trains and optimizes encoder 404, memory 408, and decoder 412. In another embodiment, memory 408 is replaced with a generative associative memory network set.

Memory 408 is a stand-alone module, which means that it is not added to, and remains separate from, encoder 404 and decoder 412. Memory 408 is generative (i.e., not deterministic), which means that memory writes and reads are inferences in a generative model, where memory 408 is treated as a distribution (i.e., p(M)). The framework that includes encoder 404, memory 408, and decoder 412 decouples the size of memory 408 from the input data size (i.e., the size of memory 408 is independent of the input data size, which provides improved scalability). Memory 408 adds only K×C+1 extra parameters to the original encoder-decoder model (i.e., a conventional generative LLM), where K is the number of slots desired for memory 408 and C is the latent dimension (i.e., the dimension of the aforementioned latent vector z).

One property of memory 408 is associativity, which means that any language input can be denoised. By having associativity, memory 408 can retrieve a remembered pattern based on a distorted or incomplete version.

Memory 408 is sparsely distributed, which means memory 408 can increase its capacity by reducing overlap between memory representations.

Memory 408 has another property of dynamic inference (i.e., memory update), which provides a fast update during an inference (e.g., a fast belief update in response to an arrival of a new data episode), thereby enabling fast episodic learning. The dynamic inference property of memory 408 also allows a building of a new episode, and generating and learning from the new episode during an inference, with no request for a re-training of the generative LLM.

Another property of memory 408 is novel generation. That is, memory 408 enables an improved generation from memory 408 of a learned episode, as well as a generative replay.

Memory 408 also provides off-line replay, which enables memory consolidation.

In order to facilitate the addressable memory, and the alterations to the dataset allowed by the addressable nature, the memory 408 includes a key generation subsystem 430 and a memory update subsystem 440. The memory 408 can be in either a static addressing mode or a dynamic addressing mode. While in the static addressing mode addresses are functions of the data and a provided static (unchanging) reference memory. While in the dynamic addressing mode, the addresses are functions of a combination of the data and a current memory state. As a result, the address is dynamic (changing) along with the current memory state.

The memory update subsystem 440 is configured to receive one or more commands 442. Depending on the command received, the memory update system 440 can interpolate memory using memory deltas by adding the memory delta (new memory content) to the current memory (changing the memory) and/or replacing the current memory with the memory delta (deleting and replacing the current memory).

While in the static addressing mode, a static reference memory 420 stores a set of statically computed basis key-value vector pairs $(k_i, z_i)$'s and corresponding key statistics $C_r$. Each reference memory $M_{reg}$ is defined by a corresponding basis key-value vector pair $(k_i, z_i)$'s (the address, the latent encoding of input where the key is the address Ki and the latent encoding of the input is the value (vector) that is desired to be written. Given a distribution P(Z), latent value vectors $Z_j$'s can be sampled. Then, basis value vectors $Z_j$'s can be chosen based on the density of the sampled $Z_j$'s and basis key vectors $K_j$'s can be preselected for memories.

To generate the static key $K_t$ using the key generation subsystem 430, for a given input $Z_t$, a function of $Z_t$ and the corresponding basis vector pairs $(K_i, Z_i)$'s or their reference memory $M_{ref}$ is computed. In one example this is done by computing a linear combination of affinities of $Z_t$ to $Z_j$'s with the respective reference keys $K_i$'s. In another example, a function of $M_{ref}$ is applied to $Z_t$.

While operating in the dynamic addressing mode, the key generation subsystem 430 stores key statistics $C_t$ and generates the dynamic key $K_t$ for an input $Z_t$ by fetching the current memory representation $M_t$ from the memory update subsystem 440 and computing the $K_t$ that results in a best possible reconstruction of $Z_t$ in a read operation with that key. The key-value functions are chosen in the same manner as in the static mode with the exception of utilizing the $M_t$ value instead of the $M_{ref}$ value.

Depending on the type of operation 442 received at the memory update subsystem 440, $K_t$ can be modified prior to serving as an address for $M_t$.

For a generative, sparse read operation (op=read([ . . . ], $G_t$, $S_t$), the key value $K_t$ is either perturbed based on the parameters of the generative descriptor $G_t$ and is sparsified based on the parameters of the sparsification descriptor $S_t$. In one example, the parameters of a distribution from which to sample a key vector to add to $K_t$ are perturbed based on $G_t$. Similarly, for sparsification, as examples, the percentage of non-zero elements in $K_t$ and the indices of $K_t$ elements (memory slots) which are not available for addressing (e.g. restricted access) can be defined using the $S_t$ parameter. Sparsification enables memory-efficient representations of addresses (e.g. resulting in faster memory operations) and memory-access control (e.g. restrict access to memory slots that encode inputs that are required to be masked).

For a sparse update operation:op=update ([ . . . ], $S_t$), the key value Kt is sparsified based on the parameters of the sparsification descriptor St as with the generative sparse read operation, however the sparsification descriptor St uses a fixed (not time-dependent) function to compute the descriptor from values. As the function is non-time dependent, "forget" operations where the data elements are removed are similarly enabled after the sparse update operation.

With reference to the operations of the memory update subsystem 440, the memory update subsystem 440 maintains a current memory representation $M_t$ as its state. For read operations (op=read([ . . . ]), the memory update subsystem 440 expects a key $K_t$ as input and outputs a latent vector $Z_t$. For update operations (op=update ([ . . . ])), the memory update subsystem 440 expects a key $K_t$ from the key generation subsystem 430 and a vector $Z_t$ from the LLM encoder 404. The update descriptor defines the particular type of the update operation, the intensity of the update operation, the type of memory delta to generate, information on how to update $M_t$ to a next state $M_{t+1}$, and the key statistics $C_t$ from the key generation subsystem 430.

The types of operations enabled by using an addressable memory can include add (write) operations and delete (forget) operations. The intensity operation can be either strong intensity or weak intensity. The type of memory deltas can be either a value memory delta, as an outer product of value and key vectors, or a residual memory delta as a value memory delta minus a readout value delta, which are scaled by a function of key statistics.

Figure 5:
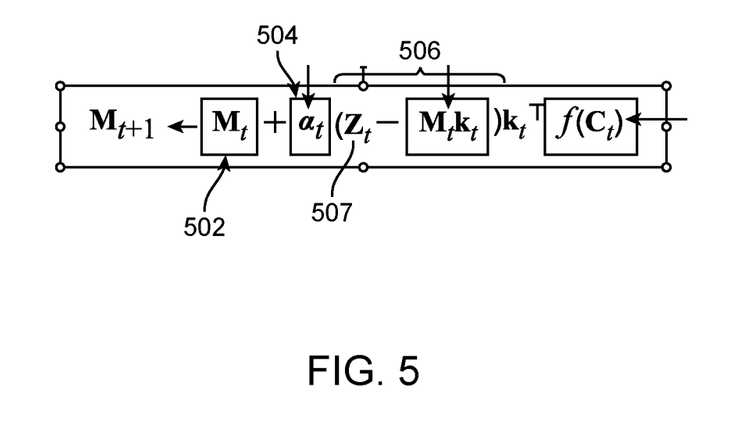
FIG. 5 depicts an operation for determining a new memory.

For an update to the dynamic addressing mode, the new memory value $M_{t+1}$ can be determined as illustrated in FIG. 5, where $M_{t+1}$ is an intensity/operation type value $\alpha_t$ multiplied by a term 506, with the term 506 being a current vector 507 ($Z_t$) minus the current memory $M_t$ times the key value $K_t$. The term 506 is multiplied by the key transformed by the function of the key statistics $C_t$. This total operation is added to the current memory 502 ($M_t$) to form the new memory $M_{t+1}$. The same update operation can be performed in a static addressing mode by replacing the $M_t$ value with an $M_{ref}$ value within the operation of FIG. 5. The intensity/operation type value at sets the type as an add operation when the value is 1, a blurry add when the value is between 0 and 1, a forget operation when the value is negative 1, and a weak forget operation when the value is between negative 1 and 0.

As used herein, an add operation permanently adds to the memory, a blurry add operation adds to the memory an approximation of data input, a forget operation permanently removes from the memory, and a weak forget operation removes from the memory an approximation of data input.

In another example, selective forgetting in a static addressing mode is achieved by assuming:

$$M = \operatorname{argmin}_{\hat{M}} \sum_j \|\hat{M} k_j - v_j\|_2^2;$$

where M is the memory value, for a set of key-value pairs. To forget a key-value pair $(K_i, V_i)$, the desired calculation is:

$$M' = \operatorname{argmin}_{\hat{M}} \sum_{j \neq i} \|\hat{M} k_j - v_j\|_2^2,$$

which can be achieved using: $M'=M+\alpha(v_i-Mk_i)k_i^T(C_0+\alpha k_i k_i^T)^{-1}$, where $\alpha=-1$ to forget. To perform this calculation the system needs to know how (ki, Vi) contributed to M and the original key Ki used to write to memory when a fixed (non-time dependent) function is used to compute the keys from values.

To achieve the key-value transformations, a function that maps $z \in \mathbb{R}^C$ to keys $k=\kappa(z) \in \mathbb{R}^K$ is used. In some cases additional sparsity/locality is desired and/or it is desired to allocate more memory space to higher-density regions of p(z). In one approach key-value transformation in a static addressing mode, the generating distribution p(z) is partitioned into K (constant) local regions. Each local region has a basis key-value pair $(K_i, Z_i)$ where k(z) is a mixture of $K_i$ for nearby $z_i$ values. A Gaussian convolution filter, such as, $\kappa_i(z) \propto e^{-|z-z_i|^2/2\sigma^2}$ is applied, and the K basis keys {ki} or one-hot orthonormal vectors of length K. The K basis values {Zi} are approximately evenly spaced samples from p(z). Once the Gaussian filter is applied, the keys become orthonormal, such that $\kappa(z)^T \kappa(z') \approx 0$ when $|z - z'| \gg \sigma$. The width $\sigma$ controls sparsity of keys (as $\sigma$ approaches zero all keys become one-hot vectors). In some examples, a variable width $\sigma^2(z) = \sigma_0^2 \cdot \min_i |z-z_i|^2$ can be used to adapt a local density p(z). The resultant basis pairs define a fixed reference memory $$M_{ref} = \sum_i k_i z_i^T.$$

Figure 6:
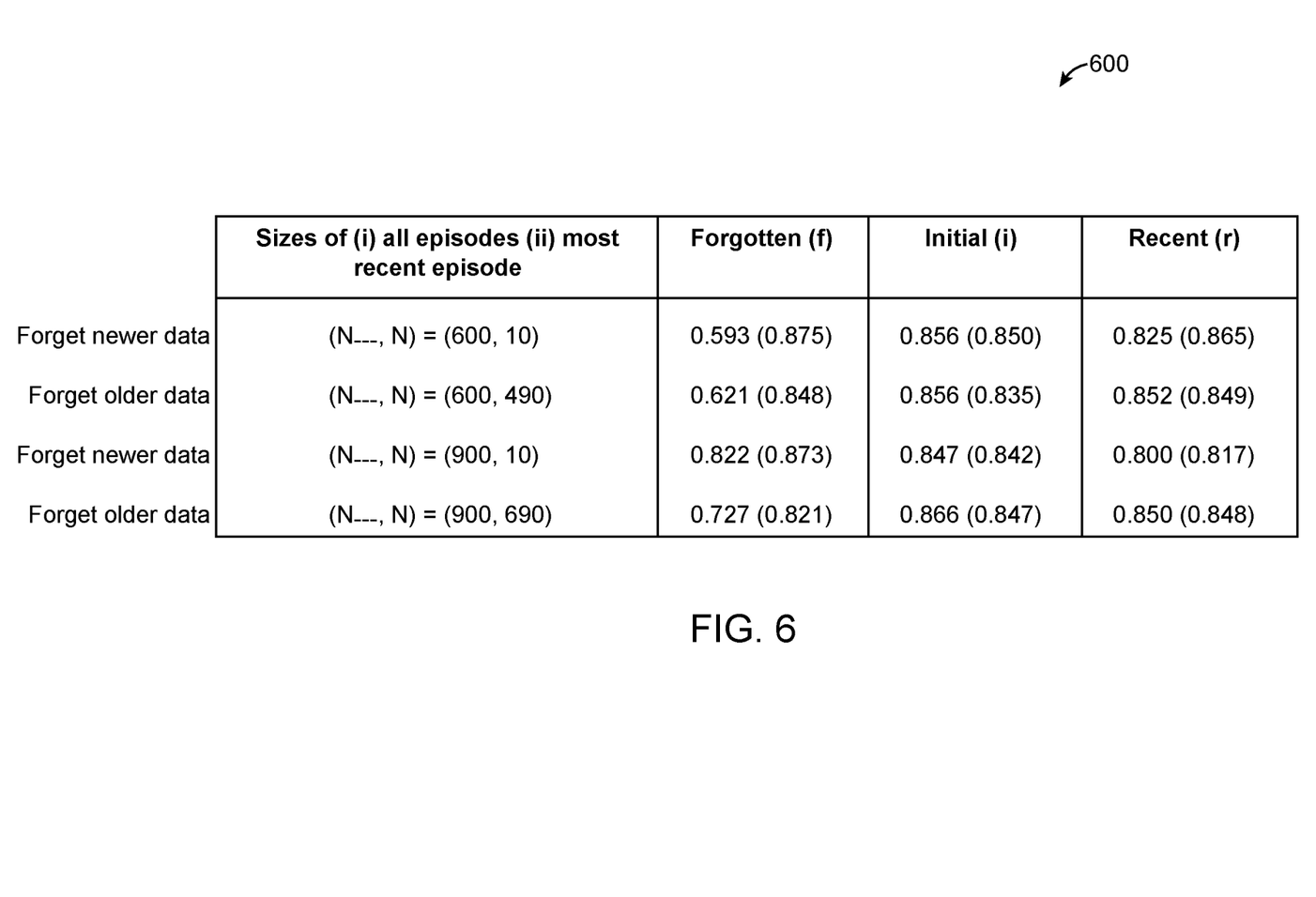
FIG. 6 depicts a table demonstrating a selective forget operation.

One practical example of a selective forgetting operation is illustrated in FIG. 6 in table 600.

In the example selective forgetting operation, an initial episode of Ni sentences is written, followed by an episode of Nf=100 that is intended to be forgotten later. Then the memory is filled up with Nr samples, for a total Ntotal=Ni+Nf+Nr samples. In the example, the size of the memory in the example is 512, however the same principles can be applied to any size memory. The static key-value function is a Gaussian convolution, with reference memory constructed via K-means++, which is method for clustering initialization. Mean RougeL scores are computed after and before (scores in parentheses) selective forgetting for each episode. Selective forgetting in this manner is effective (as evident from the large drop in RougeL scores; column label: "Forgotten") and does not compromise other memories (column labels: "Initial", "Recent"). This allows for the memory operations to degrade smoothly as the memory becomes overloaded.

In yet another practical example, the content addressable memory 408 including the memory update system 440 allows for memory system edits to be rolled back or reversed when they have an undesirable impact on the output of the LLM decoder or are no longer necessary.

In yet another practical example, the update operations 442 use of blurry adds and weak forgets allows for memory changes that are at different intensity levels, which can allow for finer control over the impact that the memory edits have on an output of the LLM decoder 412 by setting the intensity of the memory change. By way of example, a high intensity memory change will substantially impact the output for the LLM decoder 412, whereas a low intensity memory change will have a relatively minimal impact on the output.

In some practical examples the systems and methods described above enable the utilization of sequences of memory operations. By way of example, an add, add, forget, add, forget, add operation can be indicated which will sequentially perform each specified operation without the changes being made due to the initial add operation impacting the execution of the subsequent memory operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computerized system comprising:
a generative large language model (LLM) including an encoder configured to provide a vector input to a content addressable memory system and a decoder configured to receive a vector output from the content addressable memory system and generate a data output; and
the content addressable memory system being configured to receive the vector input and generate a vector output based on data contents of the content addressable memory system, and the content addressable memory system being configured to respond to receiving at least one memory update command by updating the data contents of the content addressable memory system.

2. The computerized system of claim 1, wherein the content addressable memory system is further configured to dynamically modify an associative memory matrix on which the generative LLM operates without modifying the generative LLM.

3. The computerized system of claim 1, wherein the content addressable memory system includes a static addressing mode.

4. The computerized system of claim 3, wherein the data contents of the content addressable memory system includes distinct data elements, and wherein an address of each data element in the data contents is statically dependent on the data element such that the address of each data element is dependent on the data element in a fixed, constant way, across a sequence of operations to the content addressable memory system.

5. The computerized system of claim 3, wherein the static addressing mode defines an injective mapping of data elements such that each data element is mapped to a corresponding memory address vector.

6. The computerized system of claim 1, wherein the content addressable memory system includes a dynamic addressing mode.

7. The computerized system of claim 6, the data contents of the content addressable memory system includes distinct data elements, and wherein addresses of data elements in the data contents are dynamically dependent on the data element and a current status of the content addressable memory system.

8. The computerized system of claim 1, wherein the content addressable memory system includes a key generation subsystem and a memory update system configured to cooperatively update the data contents of the content addressable memory system based on the at least one memory update command.

9. A method comprising:
receiving a memory update command at a memory system of a generative large language model (LLM), wherein the generative LLM includes an encoder configured to provide a vector input to a content addressable memory system and a decoder configured to receive a vector output from the content addressable memory system and generate a data output; and
responding to the memory update command by editing at least one data element of the content addressable memory system in accordance with the update command.

10. The method of claim 9, further comprising identifying the at least one data element to be edited using an addressing system configured to identify the at least one data element based on one of a static memory address and a dynamic memory address.

11. The method of claim 10, wherein updating the at least one data element comprises dynamically modifying an associative memory on which the generative LLM operates without modifying the generative LLM.

12. The method of claim 10, wherein the content addressable memory system includes static memory addresses, and wherein data contents of the content addressable memory system includes distinct data elements, and the address of any given data element is statically dependent on the data element, such that the address of each data element is dependent on the data element in a fixed, constant way, across a sequence of operations to the memory system.

13. The method of claim 12, wherein the static memory addresses defines an injective mapping of data elements such that each data element is mapped to a corresponding memory address vector.

14. The method of claim 10, the content addressable memory system includes dynamic memory addresses, and wherein data contents of the content addressable memory system includes distinct data elements, and wherein an address of each data element in the data contents is dynamically dependent on the data element and a current status of the content addressable memory system.

15. The method of claim 10, wherein the update command includes at least one of an add operation, a blurry add operation, a forget operation, and a weak forget operation.

16. The method of claim 15, wherein the add operation adds a data element to a memory and the forget operation removes a data element from the memory.

17. The method of claim 15, wherein the update command includes a sparsification component.

18. The method of claim 17, further comprising responding to the sparsification component by sparsifying a memory address of the data element.

19. A computer program product comprising a non-transitory memory storing a content addressable memory system configured to interface with a generative LLM, wherein the content addressable memory system is configured to receive a vector input from an encoder of the generative LLM and is configured to provide a vector output to a decoder of the generative LLM.

20. The computer program product of claim 19, wherein the content addressable memory system includes a key generation subsystem and a memory update system configured to cooperatively update data contents of the content addressable memory system based on at least one memory update command.

* * * * *